United States Patent [19]

Smith et al.

[11] Patent Number: 4,581,287
[45] Date of Patent: Apr. 8, 1986

[54] COMPOSITE RETICULATED FOAM-TEXTILE CLEANING PAD

[75] Inventors: James A. Smith, Old Tappan; Betty J. Murphy, Upper Montclair, both of N.J.

[73] Assignee: Creative Products Resource Associates, Ltd., Fort Lee, N.J.

[21] Appl. No.: 764,091

[22] Filed: Aug. 9, 1985

Related U.S. Application Data

[62] Division of Ser. No. 621,376, Jun. 18, 1984.

[51] Int. Cl.⁴ .................. B24D 3/00; B24D 11/00; B32B 27/02; B32B 5/22
[52] U.S. Cl. ........................... 428/290; 15/209 R; 51/296; 51/297; 51/400; 51/401; 428/304.4; 428/311.5
[58] Field of Search .............. 15/209 R, 226; 51/296, 51/297, 400, 401, 407; 428/290, 304.4, 311.1, 311.5, 315.5, 315.7

[56] References Cited

U.S. PATENT DOCUMENTS

| 3,242,109 | 3/1966 | Showalter | 521/122 |
|---|---|---|---|
| 3,343,910 | 9/1967 | Archambault et al. | 223/62 |
| 3,414,928 | 12/1968 | Lemelson | 15/118 |
| 3,597,887 | 8/1971 | Hall, Jr. et al. | 51/400 |
| 3,598,772 | 8/1971 | Hood et al. | 521/170 |
| 3,778,332 | 12/1973 | Butler et al. | 428/304.4 |
| 3,810,841 | 5/1974 | Richter | 252/91 |
| 3,833,386 | 9/1974 | Wood et al. | 501/82 |
| 3,861,993 | 1/1975 | Guthrie | 428/212 |
| 3,888,766 | 6/1975 | DeYoung | 210/36 |
| 3,890,254 | 6/1975 | Guthrie | 521/159 |
| 4,059,666 | 11/1977 | Fowler | 264/129 |
| 4,066,394 | 1/1978 | Leonard | 8/137 |
| 4,066,578 | 1/1978 | Murch et al. | 521/123 |
| 4,127,515 | 11/1978 | McRae et al. | 521/112 |
| 4,137,200 | 1/1979 | Wood et al. | 521/159 |
| 4,160,076 | 7/1979 | Guthrie et al. | 521/159 |
| 4,254,530 | 3/1981 | Lambert | 428/304.4 |
| 4,271,272 | 6/1981 | Strickman et al. | 521/110 |
| 4,309,509 | 1/1982 | Wood | 521/132 |
| 4,421,526 | 12/1983 | Strickman et al. | 51/296 |
| 4,537,819 | 8/1985 | Schortmann et al. | 428/311.1 |

Primary Examiner—William J. Van Balen
Attorney, Agent, or Firm—Merchant, Gould, Smith, Edell, Welter & Schmidt

[57] ABSTRACT

A composite cleaning pad is provided which incorporates a sheet of open-celled reticulated, hydrophillic polyurethane foam which integrally incorporates silane-coupled abrasives and a gelled aqueous phase and a textile sheet which covers a surface of the foam sheet and is bonded thereto.

12 Claims, 4 Drawing Figures

COMPOSITE RETICULATED FOAM-TEXTILE CLEANING PAD

This is a division of application Ser. No. 621,376, filed June 18, 1984.

BACKGROUND OF THE INVENTION

The problems encountered in producing foam-based sheets or pads designed to meet household cleaning needs have been addressed by a variety of products. Polyurethane foam-based sponge products which have been disclosed fall into two general classes, which may be designated as dry and moist. Dry sponge products are disclosed by Strickman et al in U.S. Pat. Nos. 4,271,272 and 4,421,526. These products are formed by reacting isocyanate-capped polypropylene glycol resins with small amounts of water and organic catalysts, followed by stirring powdered detergents and/or abrasives into the foaming resin. Since the molar ratio of water to free isocyanate groups on the resin is generally adjusted to about 0.5 or less, the cured foam which is obtained is dry. This results in additives such as abrasives and detergents being largely deposited in the cell voids, thus reducing the sponge's absorbency. When the sponges are remoistened, the additives must re-emulsify prior to becoming available for application in a cleaning operation.

The preparation of open-called, hydrophilic or "moist" polyurethane foams by the reaction of specially-formulated prepolymer isocyanate resins with large molar excesses of water without the need for added catalysts or cross-linking agents is disclosed in U.S. Pat. Nos. 3,890,254; 4,137,200 and 4,160,076. These resins permit the introduction of large amounts of solids into the form matrices via preformed aqueous slurries of solid particles which are subsequently reacted with the prepolymer resin in order to foam it into the desired specialty product. The finished foams are very hydrophilic, or water-absorbent, due to the entrapment of excess water within the cell walls.

U.S. Pat. Nos. 3,833,386; 4,066,394; 4,066,578; 4,309,509; and 3,343,910 describe the incorporation into hydrophilic forms of sinterable ceramic materials, water-softening minerals such as zeolites, flame retardants, ordorant-containing waxes and fine abrasives, respectively. In order to produce solids-loaded foams for use as polishing pads, sachets, water-softening sponges, cushions and the like, the weight ratio of aqueous phase to resin must be maintained at a value low enough so that the foam matrix exhibits satisfactory overall integrity. Increasing the weight of additives in foamed products formed by this method necessarily requires the use of higher ratios of water to prepolymer resin, which in turn attenuates the polymeric cellular matrix which is further embrittled by the introduction of the solids. Surfactants which result in a highly reticulated, open-celled matrix also reduce the absolute strength of the foam due to the removal of cell window membranes. Although reticulated, open-celled, hydrophilic polyurethane foams which are highly loaded with particulate abrasives are desirable due to their optimal cleaning power, when the weight ratio of dispersed abrasives in the aqueous phase to the presently-available prepolymer resins exceeds a certain value, the resultant foams will become friable. These foams are unsuitable for use as cleaning pads and sheets due to their low tensile strength which causes the cured foams to flake or crumble during use.

Thus, it is an object of the present invention to provide cleaning pads or sheets comprising a moist, hydrophilic polyurethane foam which incorporates a large amount of particulate abrasive and which further incorporates effective amounts of detergent surfactants.

It is another object of the present invention to provide resilient cleaning pads or sheets suitable for cleaning a wide variety of surfaces comprising open-celled, highly-reticulated, hydrophilic polyurethane foams of low tensile strength which comprise abrasive particles and detergents integrally incorporate within the cellular matrix of the foam.

Other objects and advantages of the present invention will become apparent from the following description and appended claims.

BRIEF DESCRIPTION OF THE INVENTION

The objects of the present invention are accomplished by a composite cleaning pad incorporating opposed foam and textile surfaces. The pad comprises a dense sheet of open-celled, reticulated hydrophillic polyurethane foam, the cell walls of which integrally incorporate a gelled aqueous emulsion comprising one or more nonionic surfactants and a particulate abrasive coupled into the walls. One surface of the foam sheet is substantially covered by a textile sheet which is integrally bonded thereto.

The pad is prepared by foaming and curing a suitable polyurethane prepolymer resin in contact with the textile sheet. The resin is foamed with an aqueous reactant phase comprising a slurry of solid abrasive particles, a coupling agent, a nonionic surfactant and a gelling agent. The coupling agent can be a silane comprising reactive functionalities which chemically bind the abrasive particles into the cell walls during the foaming process, thus imparting long-lasting scouring power to the cleaning pads. The aqueous phase comprises an amount of water in excess of that required to foam the resin. This excess water is also integrally incorporated into the cell walls of the cured foam as an aqueous phase. The nonionic surfactant will be selected from at least those which function to produce the open-celled, reticulated foam matrix. The nonionic surfactant may also include foam-formers such as amine oxides and foam-control agents such as silicone-based surfactants. Preferably, an effective detergent amount of an anionic surfactant will also be incorporated into the aqueous phase.

The aqueous phase incorporated into the cell walls of the foam sheets will be in the form of a gel. The gel can be produced by the addition of an effective amount of an inorganic gelling agent to the aqueous reactant phase used to foam the resin. The gelling agent, e.g. particles of wollastonite or smectite clay, functions to (a) stabilize the dispersion of the abrasive solids in the aqueous reactant phase, (b) control the cell size, (c) strengthen the connective matrix of the foam, and (d) impart a degree of buffing or polishing power to the foam sheet.

The textile sheet performs the dual function of reinforcing the foam sheet and providing a nonabrasive cleaning and wiping surface on the pad. When moistened, these double-surfaced pads are useful for cleaning a wide variety of porous and nonporous household or workplace surfaces, such as countertops, appliances or bathroom fixtures, including surfaces formed of wood, linoleum, metal, porcelain, glass, plastics or ceramics.

Although polyurethane foams useful in the present invention may be formed employing aqueous slurries which comprise up to about 80% by weight of the silane-treated particles, an amount of abrasive equal to about 45-75%, preferably about 50-70% of the total slurry weight is preferred, since this range of particles can be firmly bound to the cell walls and imparts effective scouring power to the cleaning pad.

Therefore, the present cleaning pads comprise a solids-loaded foam which is formed by mixing the aqueous slurry with a suitable prepolymer resin so that the final mole ratio of water to the total free isocyanate groups on the prepolymer molecules is within the range of about 5-100:1. These amounts of water react with the free isocyanate groups to release carbon dioxide which blows the prepolymer into a dense, cross-linked, open-celled foam which is rendered hydrophilic by entrapment of excess water in the cell walls of the foam. In the practice of the present invention, this entrained aqueous emulsion will exist in the cell walls in the form of a gel. The aqueous phase will also comprise emulsified surfactants, and may further comprise emulsified silicone fluids.

While the hydrophilicity of the present cleaning sheets is to be expected in view of the chemical composition of the prepolymer resin and the excess of water used to foam it, it has unexpectedly been found that the foam portion of the composite will readily and effectively absorb and hold large amounts of viscous hydrophobic liquids, such as oily chemicals, cooling oil, lubricating oil, mineral oils and the like, thus effectively cleansing a household or workplace surface of greasy soil. This effect is thought to be due in part to the strong wicking action exerted by the connecting passages between the cells. These passages are formed during foaming by the surfactant-assisted opening of the cell window membranes. These membranes do not tear away completely, but remain connected to the reticulated foam matrix to provide tubular passageways which exert a strong capillary action on a stain or liquid spill, even when the liquid has been partially absorbed by porous surfaces such as wood or concrete.

In preferred foams prepared according to the present invention, the torn windows of the cells cure with irregular or jagged edges. These edges act to further increase the effective surface area of the foam shreds and enhance the already strong wicking action of the composition. The irregular, or reticulated surface of the foam sheet also increases the scouring power imparted by the abrasive particles.

Both the surface-and-deep-cleaning activity of the present composite cleaning sheets are enhanced by incorporating an effective detergent amount of one or more surfactants in the aqueous phase used to form the foams. The water in excess of that required to foam the resin is integrally incorporated within the cell walls of the foam. This water, along with the surfactants and other additives emulsified therein, is released when the pad is wetted and contacted with the soiled surface under conditions of pressure, such as by rubbing the foam or textile side of the cleaner over the soiled surface. The surfactants act to foam the aqueous phase and to wet oily dirt. The surfactant then functions to disperse the grease in the aqueous phase, which is reabsorbed by the porous cleaning sheet.

As used herein, the term "cell walls" is intended to include any portion of the polymeric framework of the present foams, including the connective matrix and the cell window membranes.

DETAILED DESCRIPTION OF THE INVENTION

Figure 1:
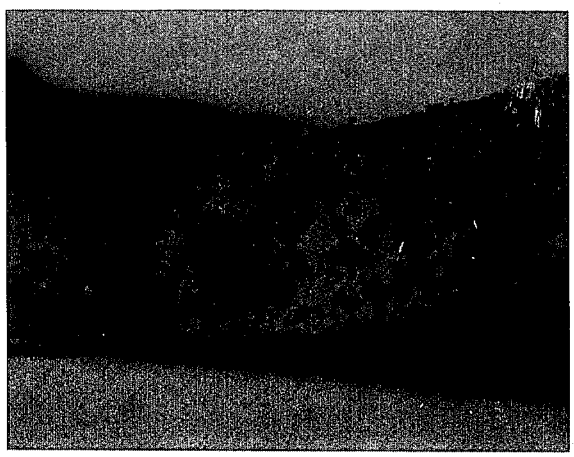
FIG. 1 is a photographic sectional view of a coated layer formed according to the invention.

The composite cleaning pads of the present invention are prepared by a process comprising forming an aqueous slurry which includes solid abrasive particles which have been treated with a silane-coupling agent. The term "pads" as used herein is intended to include any body appropriately shaped so as to incorporate both a foam and a textile surface, including but not limited to shaped pads for manual application or for application by power-driven units, as well as thin towel-like cleaners. The slurry further will include an amount of a nonionic surfactant effective to form an open-celled, reticulated foam upon reaction of the aqueous phase with a water-foamable polyurethane prepolymer resin. The nonionic surfactant mixture is also preferably compounded so as to allow the aqueous phase formed when the cleaning sheet is moistened to disperse or dissolve greasy spills or stains. One or more gelling agents will also be included in the slurry in an amount effective to control the cell size of the finished foam, to stabilize the aqueous phase remaining within the cell walls, and to strengthen the cellular structure of the foam.

The aqueous phase can further comprise additional foam-forming and structuring agents such as silicone fluids, and additional surfactant types which also act to build the cleaning power of the finished composition and to stabilize the moist foam matrix. The fully-formed aqueous slurry is then combined with a water-foamable prepolymer resin and the reaction mixture allowed to foam and cure in contact with a textile layer. A composite cleaning pad results which comprises a self-cross-linked, open-celled, polyurethane sheet, one face of which is tightly bound to the textile sheet via intermingling of the cured foam matrix with the textile fibers.

A commercially available class of water-foamable prepolymer resins which yield cross-linked, hydrophilic polyurethane foams upon the addition of stoichiometric excesses of water are those belonging to the Hypol® series (W. R. Grace & Co.; FHP 3000, 2000, 2000 HD, 2002) which are generally described in U.S. Pat. No. 4,137,200, the disclosure of which is incorporated by reference herein. These liquid resins are prepared by capping mixtures of low molecular weight polyols having 3-8 hydroxyl groups and polyoxyethylene diols with toluene diisocyanate. The capped alcohol mixtures have an average number of free isocyanate groups per molecule which is equal to two or more, i.e., 2-8.

These resins possess molecular weights within the range of about 1300-1400 and have about 1.5-2.5 mEq./g. of free isocyanate groups. Upon being contacted with a molar excess of water, the isocyanate groups hydrolyze to release carbon dioxide gas, thus foaming the resin without the need for added catalysts or blowing agents. The free amino groups formed by the hydrolysis reaction react with unhydrolyzed isocyanate groups to form ureido groups which crosslink and stabilize the foam, while entrapping a part of the excess water in the cell walls, where it acts to impart hydrophilic properties to the foam. The compatibility of the foam matrix with large molar excesses of water is a necessary requirement of resins useful in the practice of the present invention, since large amounts of water are needed to uniformly introduce large amounts of abrasive material into the matrix.

Other poly-$C_2$-$C_3$-alkyleneoxy glycols capped with aromatic isocyanates may be prepared which possess a suitable balance between their extent of cross-linking prior to foaming and their ability to cross-link or to further cross-link during foaming (due to the presence of more than two reactive isocyanate groups per resin molecule), so as to be useful in the practice of the present invention over the entire range of solids and surfactant content. These prepolymer resins are prepared by polymerizing ethylene oxide to yield polyalkylenoxy polyols having a molecular weight of about 900–1100. These polyols are reacted with a stoichiometric excess of a polyisocyanate. Suitable isocyanates include toluene diisocyanate, triphenylmethane-4,4',4''-triisocyanate, benzene-1,3,5-triisocyanate, hexamethylene diisocyanate, xylene diisocyanate, chlorophenylene diisocyanate and mixtures thereof. The useful resins recovered have a somewhat lower number of mEg of free isocyanate groups (NCO) per gram of resin than do the Hypol ® resins, e.g. 1.3–1.5 mEq NCO/gram and exhibit a substantially higher tensile strength when foamed and cured at ambient temperatures to incorporate high percentages of dispersed abrasives.

One such commercially available self cross-linking resin is TRE STD ® prepolymer resin (Twin Rivers Engineering Co., East Booth Bay, ME), which forms acceptable foams upon reaction with at least a stoichiometric excess of water without employing a low molecular weight polyol component to raise the average number of free isocyanate groups per glycol ether molecule to above two. TRE STD ® resin has an average free isocyanate content of about 1.4 mEq./gram, comprises a polyol component having an average molecular weight of about 1000, exhibits a viscosity at 32° C. of 4700 cps and solidifies at 15.5° C. In the practice of the present invention, useful foams may be formed employing a weight ratio of water to prepolymer resin of 0.5–2:1, preferably 0.75–1.5:1. These ranges yield a mole ratio of water to free isocyanate groups of about 20–80:1, preferably about 30–60:1.

Particulate abrasive solids are employed as components of the present cleaning compositions and are dispersed and bound throughout the foam matrix by silane-coupling agents as described below. The choice of abrasive material may be made from a wide variety of materials of adequate hardness and of a particle size range which will enable them to effectively scour soiled surfaces. The solids will preferably comprise about 45–75% by weight of the aqueous reactant phase, most preferably about 50–70%. The weight ratio of abrasive to prepolymer which may be used is limited only by the ability of the foamed polymeric matrix to retain the abrasive particles without undue separation and loss of the solid during preparation, shipping or use. Preferably, the weight of the abrasive used will be from about 100–500% of the prepolymer weight, most preferably 150–300%. These high weight ratios of water and abrasive to resin yield soft, flexible, extremely dense foams, which after curing at ambient temperatures, exhibit densities of from about 0.2–0.4 g/cc, preferably about 0.25–0.35 g/cc, and breaking strengths of about 300–400 g (unreinforced).

A preferred abrasive for use in the foams of the present invention is F-4 Feldspar ® (170–200 mesh) available from International Minerals and Chemical Corporation, Mundelein, Ill.

Due to the necessity of employing a silane-coupling agent to effectively bind the preferred amounts of abrasive particles to the foam matrix, abrasive particles are preferably chosen from those substances which possess sufficient free surface Si—OH or Al—OH groups to form reactive sites for the silane-coupling agents. Among the substances that meet this requirement are minerals such as the feldspars, quartz, aluminas, diatomaceous earths, sands, glasses, naturally-occurring and synthetic zeolites, zircon, carborundum, pumice and the like, which may be used singly or in mixtures. The silane-treated abrasive solids are introduced into the present cleaning compositions as components of the aqueous reactant phase, in which they are suspended prior to the foaming reaction, as described hereinbelow.

The compositions of the present invention will also include a minor but effective amount of a silane-coupling agent which functions to bond to both the polyurethane matrix and the surface of the particles of the inorganic abrasive, thus chemically-coupling the abrasive into the polymeric matrix and preventing the abrasive particles from separating from the foam matrix during packaging or use. Silane-bound solid particles also clump less readily and so are more evenly dispersed throughout the matrix during foaming.

Useful silane-coupling agents may be selected from members of organosilicon monomers such as aminoalkyl(trisalkoxy)silanes which are characterized by the formula R—$SiX_3$, wherein R is an organofunctional group attached to silicon in a hydrolytically stable manner and X designates hydrolyzable groups which are converted to silanol groups upon hydrolysis. Most commonly, R comprises 3-aminopropyl or 3-ureidopropyl moiety which may be further separated from the silicon group by one or two —$NH(CH_2)_n$— moieties wherein n=1–2. Preferably X is an alkoxy group selected from the group consisting of methoxy, ethoxy, 2-methoxyethoxy or is acetoxy. Preferred silane-coupling agents are commercially-available from Union Carbide as the A1100-A1160 series which includes 3-aminopropyltriethoxysilane, 3-aminopropyltrimethoxysilane (also available from Dow Corning as Z-6020), N-2-aminoethyl-3-aminopropyl-trimethoxysilane, or 3-ureidopropyl-triethoxysilane.

A thick slurry of the abrasive particles is prepared with about 50–70% by weight of the total water used to form the aqueous phase. The aqueous slurry, which may contain up to about a 500% weight excess, preferably an about 300–400% excess of abrasive particles, is then treated with an amount of the silane-coupling agent equal to about 0.1–5% by weight of the amount of slurried solid. Completion of the hydrolysis reaction is assured by warming the slurry to at least about 21°–32° C. at which point the other components of the aqueous phase may be added, along with the remainder of the water. When the abrasive solid particles are coated in this fashion, the free amino groups of the coupling agent bind to the polymeric chains of the substrate during the foaming step, i.e., when the aqueous reactant phase and the polyurethane prepolymer are mixed together.

When foamed with appropriate excesses of water comprising slurried, coupled solids and the appropriate surfactants, these prepolymer resin types will afford open-celled foam sheets which possess many of the properties essential for use in composite cleaning pads. However, within the preferred range of solids, e.g. about 100–500% of the prepolymer weight, the strength of the cured foam sheets often falls to a level insufficient to maintain their integrity even after reinforcement with the textile layer. The observed cracking and crumbling of such cleaners during use is believed to be due to the attenuation and embrittlement of the open-celled foam matrix by the particulate solids and the large amounts of water needed to suspend the solids.

Surprisingly, we have found that cured foams exhibiting satisfactory structural integrity for use in the present composite cleaning pads can be prepared if a gelling agent is added to the aqueous phase in an amount effective to gel the aqueous emulsion which is incorporated into the cell walls of the cured foam. In practice, the aqueous reactant phase is gelled by the addition of an effective amount of one or more organic or inorganic gelling agents. Organic gelling agents useful in the practice of the present invention include carboxymethycellulose, polyvinylpyrrolidone and polymeric organic waxes. The useful polymeric waxes include ethylene acrylate copolymers, ethylene acrylic acid copolymers, and polyethylene (e.g. oxidized polyethylenes). These materials are commercially available in the form of aqueous emulsions or dispersions, e.g. from Allied Chemical, Morristown, NJ, as the A-C Copolymer and A-C Polyethylene series, such as A-C Copolymer 540, A-C Copolymer 580 and A-C Polyethylene 617 and 629. The aqueous dispersions may also comprise small amounts of surfactants, i.e. anionic or nonionic surfactants, which aid foam reticulation. The wax dispersions may be added directly into the slurried solids, or pretreated with other gelling agents, surfactants and the like.

Preferably, the inorganic gelling agents employed will comprise those of natural or synthetic of mineral origin. Preferred gelling agents are the smectite clays such as the saponites and the montmorillonite colloidal clays such as Veegum ® (Vanderbilt Minerals, Murray, KY) or Magnabrite ® (American, Colloid Co., Skokie, IL). Inosilicates can also be used, alone or in combination with the clays to produce fine open-celled foams. Preferred inosilicates are the naturally-occurring calcium metasilicates such as wollastonite, available as the NYAD ® wollastonite series (Processed Minerals Inc., Willsboro, NY), of which NYAD ® 400 is especially preferred. Synthetic sodium magnesium silicate clays and fumed silicas can also be used as gelling agents.

The solid gelling agents can be introduced into the aqueous reactant phase as dry powders at any convenient time during its formation. Preferably they will be added after reaction of the particulate abrasive with the silane coupling agent. In other procedures, the gelling agent is mixed with the balance of the water, e.g. about 30–50% of the total water, so as to preform a gel, before it is mixed into the slurried abrasive. The gelling agent will be used in amounts equal to about 2–20%, preferably about 3–15% by weight of this reserved water. The suspensions which result are stirred into the abrasive slurry at about 25°–30° C. and assist in maintaining the solids in an even suspension and in stabilizing the emulsion which results when the surfactants and silicone or fluid are added to the slurried solids. Since a major portion of the water is lost during the curing process, the addition of these amounts of gelling agent to the aqueous reactant phase maintains the aqueous emulsion which remains entrained within the cellular matrix in the form of a gel, thus preventing its evaporative loss from the foam sheet. The clays also enhance the polishing properties of the foam without embrittling and weakening the cellular matrix as do other siliceous and aluminous abrasives, such as the feldspars, and surprisingly produce a stronger cellular matrix than that obtained when the resin is foamed in their absence. When present, the polymeric wax component can enhance the polishing ability of the pads by depositing as a thin, smooth film on the surface which is cleaned.

One or more foam-reticulating surfactants will also be incorporated into the aqueous phase. These surfactants function to remove the window membranes of the foam cells, thus producing the desired recticulated, or highly open, structure. The surfactant also functions to enhance the cleaning power of the finished composition by dispersing greasy dirt when the moistened cleaning sheet contacts the soiled area. Foam reticulating surfactants are preferably selected from nonionic types which are soluble or dispersible in water.

Preferred nonionic surfactants include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic ® surfactants (BASF Wyandotte Corp.), especially those in which the polyoxypropylene ether has a molecular weight of about 1500–3000 and the polyoxyethylene content is about 35–55% of the molecule by weight, i.e. Pluronic ® L-62.

Other useful nonionic surfactants include the condensation products of $C_8$–$C_{22}$ alkyl alcohols with 2–50 moles of ethylene oxide per mole of alcohol. Examples of compounds of this type include the condensation products of $C_{11}$–$C_{15}$ secondary alkyl alcohols with 3–50 moles of ethylene oxide per mole of alcohol which are commercially-available as the Poly-Tergent ® SLF series from Olin Chemicals or the Tergitol ® series from Union Carbide, i.e. Tergitol ® 25-L-7, which is formed by condensing about 7 moles of ethylene oxide with a $C_{12}$–$C_{15}$ alkanol.

Other nonionic surfactants which may be employed include the ethylene oxide esters of $C_6$–$C_{12}$ alkyl phenols such as (nonylphenoxy)polyoxyethylene ether. Particularly useful are the esters prepared by condensing about 8–12 moles of ethylene oxide with nonylphenol, i.e. the Igepal ® CO series (GAF Corp., New York, NY).

Another useful class of nonionic surfactant is especially-preferred for incorporation into the present foams for the ability to foam the water used to moisten the cleaners. This class includes the amine oxides, such as the $C_{10}$–$C_{20}$-alkyl-di(lower)alkyl-amine oxides or the $C_{10}$–$C_{20}$-alkylamino($C_2$–$C_5$)alkyl di(lower)alkyl-amine oxides. Especially preferred members of this class include lauryl(dimethyl)amine oxide, myristyl(dimethyl- )amine oxide, stearyl(dimethyl)amine oxide (Schercamox® DMS, Scher Chemicals, Inc., Clifton, NJ), coco(bis-hydroxyethyl)amine oxide (Schercamox® CMS), tallow(bis-hydroxyethyl)amine oxide and cocoamidopropyl(dimethyl)amine oxide (Schercamox® C-AA).

Another useful class of nonionic surfactant is the silicone-glycol copolymers. These surfactants are prepared by adding poly(lower)alkylenoxy chains to the free hydroxyl groups of dimethylpolysiloxanols and are available from the Dow Corning Corp as Dow Corning 190 and 193 surfactants (CTFA name: dimethicone copolyol.) These surfactants function, with the silicone fluids, to control the foaming produced by the other surfactants, and also impart a shine to metallic surfaces.

Other useful nonionics include the ethylene oxide esters of alkyl mercaptans such as dodecyl mercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, the condensation products of ethylene oxide with partial fatty acid esters of sorbitol such as the lauric ester of sorbitan polyethylene glycol ether, and other similar materials, wherein the mole ratio of ethylene oxide to the acid, phenol, amide or alcohol is about 5-50:1.

The total amount of nonionic surfactant which is used to reticulate the present foams is preferably about 0.5-20%, most preferably 1-10% by weight of the aqueous phase.

In addition to one or more nonionic surfactants, the foams used in the cleaning sheets of the present invention will preferably incorporate an effective amount of one or more anionic surfactants in amounts equal to about 0.5-5% preferably about 1-3% by weight of the aqueous phase. Anionic surfactants preferred due to their high detergency include anionic detergent salts having alkyl substituents of 8 to 22 carbon atoms such as the water-soluble higher fatty acid alkali metal soaps, e.g., sodium myristate and sodium palmitate. An especially preferred class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group (e.g., sodium dodecylbenzenesulfonate, magnesium tridecylbenzenesulfonate, lithium or potassium pentapropylenebenzenesulfonate). These compounds are available as the Bio-Soft® series, i.e. Bio-Soft® D-40 (Stephan Chemical Co., Northfield, IL).

Other useful classes of anionic surfactants include the alkali metal salts of alkyl naphthalene sulfonic acids (methyl naphthalene sodium sulfonate, Petro® AA, Petrochemical Corporation); sulfated higher fatty acid monoglycerides such as the sodium salt of the sulfated monoglyceride of coconut oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium $C_{14}$-$C_{16}$-alphaolefin sulfonates such as the Bio-Terge® series (Stephan Chemical Co.); alkali metal salts of sulfated ethylenoxy fatty alcohols (the sodium or ammonium sulfates of the condensation products of about 3 moles of ethylene oxide with a $C_{12}14$ $C_{15}$ n-alkanol, i.e., the Neodol® ethoxysulfates, Shell Chemical Co.); alkali metal salts of higher fatty esters of low molecular weight alkylol sulfonic acids, e.g., fatty acid esters of the sodium salt of isethionic acid; the fatty ethanolamide sulfates; the fatty acid amides of amino alkyl sulfonic acids, e.g. lauric acid amide of taurine; as well as numerous other anionic organic surface active agents such as sodium xylene sulfonate, sodium naphthalene sulfonate, sodium toluene sulfonate and mixtures thereof.

A further useful class of anionic surfactants includes the 8-(4-n-alkyl-2-cyclohexenyl)-octanoic acids wherein the cyclohexenyl ring is substituted with an additional carboxylic acid group. These compounds, or their potassium salts, are commercially-available from Westvaco Corporation as Diacid® 1550 or H-240.

In general these organic surface active agents are employed in the form of their alkali metal salts, ammonium or alkaline earth metal salts as these salts possess the requisite stability, solubility, and low cost essential to practical utility.

Amphoteric detergents may also be incorporated into these hydrophilic foams. These detergents will be employed in a compatible proportion and manner with the nonionic-anionic surfactants, and may comprise about 0.5-10%, preferably 1-5% of the aqueous phase.

Examples of amphoteric detergents which may be employed include the fatty imidazolines, such as 2-coco-1-hydroxyethyl-1-carboxymethyl-1-hydroxylimidazoline and similar products made by reacting monocarboxylic fatty acids having chain lengths of 10-24 carbon atoms with 2-hydroxyethyl ethylene diamine and with monohalo monocarboxylic fatty acids having from 2 to 6 carbon atoms; the fatty beta-alanines such as dodecyl beta-alanine, the inner salt of 2-trimethylamino lauric acid, and betaines such as N-dodecyl-N, N-dimethylamino acetic acid and the like.

Minor but effective amount of fragrance selected so as to be chemically-compatible with the above-described surfactants are preferably included in the aqueous phase for cosmetic purposes. Useful fragrances will include, for instance about 0.025-2%, preferably about 0.05-1.5% of floral oils such as rose oil, lilac, jasmine, wisteria, lemon, apple blossom, or compounds boquets such as spice, aldehydic, woody, oriental, and the like.

Silicone fluids may also be employed optionally as foam cell initiating and structuring agents and are selected from those which function to control cell size and aid reticulation. There fluids also function to break the foam produced by the surfactants and deposited on the surfaces after wiping, thus eliminating the need to rinse the surfaces after they have been cleaned. Useful classes of silicone fluids include the linear polymethylsiloxanes or the tetrameric or pentameric cyclic siloxanes (cyclomethicones) which are available from Rhone-Poulenc, Inc. (Monmouth Junction, NJ) as the Rhodorsil® 47V series or from Dow Corning as the Dow Corning® 200 fluid series in a wide range of viscosities (i.e., 10-10,000 cps.). When used as a component of the present foams, about 0.1-20%, preferably 1-10% by weight of the aqueous phase of a silicone fluid of about 0.5-150 cps viscosity, preferably about 25-100 cps, can be employed.

Minor amounts of other foam-compatible adjuvants, such as dyes, flame retardants and the like, may be introduced into the present foam products in effective amounts either via the aqueous or resin phase or by treating the final product with the adjuvants as by spraying, mixing, etc. When employed in the present products, such adjuvants will commonly be present at levels of up to about 5–10% by weight of the finished product.

Therefore, the foam component of the present composite cleaners is formed by mixing and foaming the prepolymer resin with the aqueous reactant phase.

A preferred aqueous reactant phase would comprise about 15–35% water, 45–65% by weight of abrasive particles which have been surface-treated with about 0.1–5% by weight of the abrasive of a silane-coupling agent, about 4–8% by weight of a nonionic surfactant, about 1.5–2.5% by weight of an anionic surfactant, about 2–10% of a silicone fluid and about 0.5–15%, preferably about 1–10% of a gelling agent, in admixture with minor amounts of dye and/or fragrance. Preferably the weight ratio of the surfactant mixture used will be about 6–1:1 nonionic:anionic surfactant most preferably about 3–1.5:1. This ratio will be maintained in the finished cleaning pads since the surfactants are not appreciably evaporated during the curing step.

To prepare the foam portion of the present cleaning cloths, a warmed aqueous slurry of the particulate abrasive and the silane coupling agent in about 50–70% of the total water is prepared as described hereinabove. The poly(lower)alkylenoxy group-containing nonionic surfactants can then be added or they may be added along with gelled balance of the water. The balance of the water, which has preferably been pretreated with a gelling agent, is then stirred into the solids slurry, followed by addition of the remaining surfactants and silicone fluid. Alternatively, the aqueous reactant phase minus the gelling agent may be preformed prior to the addition of the gelling agent.

The stirred aqueous phase is then cooled via the external application of an ice bath to about 8°–15° C. and the fragrance added. The prepolymer resin, which may be predyed if desired, is then warmed to about 35°–45° C. and blended with the cooled aqueous phase to initiate the foaming reaction. The aqueous phase will preferably be combined with the prepolymer resin in a weight ratio of aqueous phase to prepolymer resin of about 4–2:1. The preferred mole ratio of water to moles of available isocyanate groups is thereby adjusted to be within the range of about 30–60:1. The foaming polymer is then immediately coated onto a textile sheet by conventional methods and allowed to cure without applied heat. Typically, the foaming resin is cured in a closed mold lined on one surface with a textile sheet.

The amount of foaming resin introduced into the mold is adjusted so that, as the forming reaction proceeds, the foam expands to fill the mold and impregnates and binds the textile sheet. If the expanding upper surface is compressed to the extent that a skin forms upon curing which blocks access to the cellular body of the foam, it will be removed, i.e. by slicing, to expose a highly reticulated, porous surface. Therefore, the exposed surface of the foam sheet will be formed or treated so as to be skinless in the finished cleaning pad.

The textile sheet may be selected from any of the natural or synthetic, woven or nonwoven fabrics which posses sufficient hydrophilicity to remain firmly bonded to the foam layer during use and which posses sufficient tensile strength to prevent the foam sheet from cracking or separating during use. A preferred nonwoven fabric comprises a polyester/rayon blend, most preferably a 70–80% polyester, 20–30% rayon blend such as are available from Crown Textile Co. in weights of about 1.0–5.0 oz./yd. Multi-ply textiles may be employed, thus allowing the preparation of cleaners in which the thickness of the cloth portion is equal to or exceeds that of the foamed sheet. The preferred textile sheets can increase the apparent breaking strength of the foam sheets to which they are bound by about a factor of 5–15, i.e. from an unbound breaking strength of about 300–400 g to a composite strength of about 3000–4000 g.

The invention will be further described by reference to the following detailed examples.

EXAMPLE I

A reaction kettle equipped with turbine stirring was charged with 172.0 g of distilled water which was warmed to 28° C., Powdered 200 mesh F-4 feldspar (602.4 g) was added with rapid stirring, followed by slow addition of 3.1 g of n-2-aminoethyl-3-aminopropyl-trimethoxysilane (Dow Z-6020). The resultant slurry was stirred for 30 minutes while the temperature was maintained at 28°–30° C. Pluronic ® L-62, Dow ® 190 (13.4 g) and Tergitol ® 25-L-7 (13.4 g) were added with continued stirring.

In a second kettle, 13.4 g of Magnabrite ® was added to 115 g of water and stirred at 45° C. until a gel formed. The gel was cooled to 28° C. and stirred into the feldspar slurry, followed by the sequential addition of 17.4 g of BioSoft ® D-40, 29.4 g of Schercamox ® CAA and 13.4 g of Rhodosil ® 47V-50 silicone fluid with continued stirring. The aqueous phase was cooled to 9°–10° C. Lemon fragrance (3.0 g) was stirred into a 747 g portion of the cooled slurry and 250 g of TRE ® standard prepolymer resin which had been preheated to 38°–40° C. was added with stirring. After 10 seconds of agitation, fifty gram portions of the foaming mixture were employed to fill twenty 6.0"×7.0"×0.25" molds. The bottom of each mold was lined with a single, nonwoven sheet of 70-30 rayon/polyester fabric (1.25 oz-/yd$^2$). The molds were immediately closed and the foam allowed to cure and bind to the nonwoven sheets for 3.5 minutes. The molds were opened and the finished pads removed and allowed to cool to room temperature.

EXAMPLE II

Similar procedures were employed to prepare foam-coated textile cleaners employing the formulations summarized on TABLE I, Exs. A and C–E.

To prepare the aqueous reactant phase summarized in Ex. B, 74.4 g of water was warmed to 30° C. and 300 g of F-4 Feldspar ® added with rapid stirring, followed by the slow addition of 1.55 g of Dow ® Z-6020. After 30 minutes of stirring at 28°–30° C., the slurry was cooled to 10° C. and the surfactants added, followed by the remainder of the water and the wollastonite powder. The thick gel was treated with the fragrance and a trace of green dye. The remainder of the procedure followed that given in Ex. 1.

The composite cleaner of Ex. IIC exhibited a breaking strength of 3488 g (elongation at break 75.9%). When cured apart from the textile, a foam layer of equivalent thickness exhibited a breaking strength of only 350 g (elongation at break 109.9%). The breaking strength and elongation values represented an average of five runs conducted on an Instron Tensile Tester, Model TTC(CRE) according to ASTM D-1682 (2.54 cm cut strip method).

TABLE I
HYDROPHILIC FOAM COMPOSITIONS OF EX. II

| Ingredient | Weight Percent | | | | |
|---|---|---|---|---|---|
| | A | B | C | D | E |
| Distilled Water | 21.72 | 18.95 | 21.72 | 21.72 | 21.77 |
| Magnabrite ® | 1.00 | 1.00 | 1.00 | 1.00 | 1.00 |
| Wollastonite NYAD ® 400 | — | 4.07 | — | — | — |
| Feldspar (0.23% Z6020) | 45.23 | 45.61 | 45.23 | 45.23 | 45.23 |
| Silicone Fluid (50 cps) | 1.00 | — | 1.00 | 1.00 | 1.00 |
| Pluronic ® L-62 | 1.00 | 1.00 | 1.00 | 1.00 | 1.00 |
| Tergitol ® 25-L-7 | .80 | — | — | — | — |
| Poly-Tergent ® SLF-18 | — | — | — | 1.25 | — |
| Igepal ® CO-660* | — | 1.25 | 1.25 | — | — |
| Neodol ® 25-35 | — | 1.50 | 1.50 | 1.50 | — |
| Bio-Soft ® D-40*** | 1.50 | — | — | — | 2.30** |
| Dow Corning ® 190 | 0.25 | 0.25 | 0.25 | 0.25 | 0.50 |
| Schercamox ® CAA | 2.20 | 1.75 | 1.75 | 1.75 | 2.20 |
| Fragrance | 0.30 | 0.30 | 0.30 | 0.30 | — |
| TRE STND ® Prepolymer | 25.00 | 25.00 | 25.00 | 25.00 | 25.00 |

*Igepal ® CO-710 also gave satisfactory results
**Equivalent amounts of Biosoft N-300, BioSoft D-60 or Biosoft ® D-35-X also yielded satisfactory final products.
***1.50% Neodol 25-35 could also be employed in place of the Bio-Soft ® D-40.

The composite foam-cloth pads which were obtained possessed an even foam layer which had a layer of nonwoven fabric firmly bonded to one side. Each fabric sheet had 25–27 g of cured foam adhered thereupon. The pads moistened readily in water and released a finely-foamed detergent emulsion when either side was applied to a hard surface under conditions of pressure. After a few seconds, a foam broke, leaving a thin film of silicone on the cleaned surface which imparted a shine to plated or polished metal surfaces. The foam surface strongly absorbed greasy or oily films and removed hardened soil deposits by an abrasive action without depositing a residue of loosened abrasive. The textile side provided a nonabrasive surface useful to clean easily scratched surfaces.

The composite cleaner of Ex. IID is photographically illustrated in FIG. 1 (partial side view, 10× magnification). The open-cellular structure is clearly apparent, as is the highly-reticulated surface of the foamed layer. The relatively smooth-surfaced nonwoven sheet is clearly shown on the bottom side of the pad.

Figure 2:
FIG. 2 is a photographic magnified portion of the foam layer of FIG. 1.

As is shown by FIG. 2, which is a photographic 40× magnification of a portion of the foam layer of the FIG. 1 cleaner, the irregular cell voids are substantially free of particulate matter. The cell window membranes of the foam are largely broken and remain adhered to the interconnecting cell matrix strands in jagged globular masses, producing a foam of high surface area, scouring power and absorbancy. The gelled aqueous phase with its detergent emulsion and the abrasive particles is incorporated integrally with the cellular matrix.

The composite cleaner of Ex. IIB is photographically depicted (partial side view, 10× magnification) in FIG. 3. The open cells of the foam layer are finer and more uniform in structure than the cells shown in FIG. 1. FIG. 4 is a 40× photographic magnification of a portion of the foam layer shown in FIG. 3. The highly reticulated nature of the open-celled foam matrix with its adhered, broken window membranes is clearly shown. The fine, rounded cell voids are highly absorbent and evenly release the surfactant emulsion from the wetted sponge when it is rubbed over a soiled surface.

Figure 3:
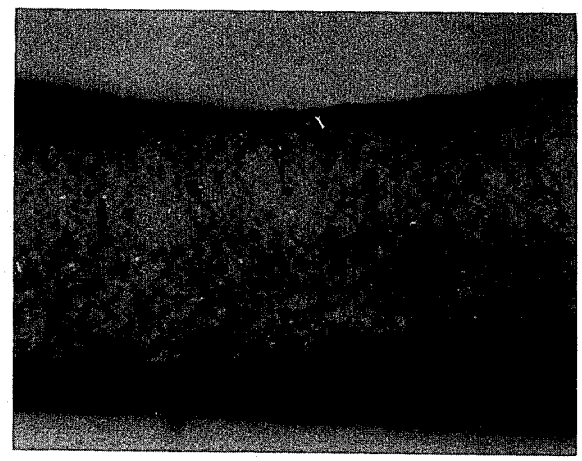
FIG. 3 is another photographic sectional view of a coated layer formed according to the invention.
Figure 4:
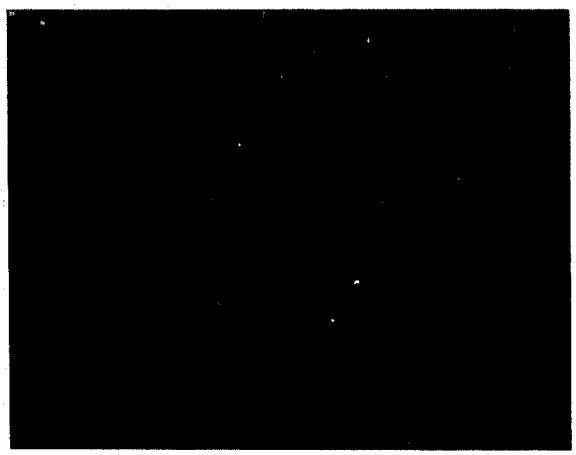
FIG. 4 is a photographic magnification of a portion of the foam layer in FIG. 3.

Since the foam layer shown in FIGS. 1–2 was prepared employing a smectite clay, while the foam shown in FIGS. 3–4 was prepared employing an inosilicate, wollastonite, as the gelling agent, it is expected that mixtures of the two types of mineral gelling agent will allow the formation of foam sheets having an intermediate cellular structure, e.g. possessing cells which are larger than those depicted in FIGS. 3–4, but which are more regular than those shown in FIGS. 1–2. In this manner, both the relative absorbancy and the regularity of the surface of the foam side of the cleaning pads can be adjusted over a wide range by relatively simple variations in the composition of the gelling agent used. For example, a blend of about 75–85% wollastonite and 15–25% mortmorillonite will possess a preferred balance between the evenness of the cell structure and the reticulation necessary for good scouring power.

The invention has been described with reference to various specific and preferred embodiments and techniques. However, it should be understood that many variations and modifications may be made while remaining within the spirit and scope of the invention.

What is claimed is:

1. A composite cleaning pad incorporating opposed foam and textile surfaces comprising:
   (a) a sheet of open-celled, reticulated hydrophillic polyurethane foam, the cell walls of said foam integrally incorporating:
      (i) a gelled aqueous emulsion comprising a nonionic surfactant; and
      (ii) a coupled particulate abrasive; and
   (b) a textile sheet covering a surface of said foam sheet and integrally bonded thereto, wherein said foam sheet exhibits a density of about 0.2–0.4 g/cc.

2. The cleaning pad of claim 1 wherein said foam sheet exhibits a breaking strength of about 300–400 g.

3. The cleaning pad of claim 1 wherein said gelled aqueous emulsion comprises an amount of an inorganic gelling agent effective to gel said emulsion.

4. The cleaning pad of claim 3 wherein the inorganic gelling agent comprises a smectite clay, an inosilicate mineral or mixtures thereof.

5. The cleaning pad of claim 1 wherein said gelled aqueous emulsion comprises an amount of an organic gelling agent effective to gel said emulsion.

6. The cleaning pad of claim 5 wherein the organic gelling agent comprises a polymeric wax.

7. The cleaning pad of claim 1 wherein the emulsion further comprises a silicone fluid.

8. The cleaning pad of claim 1 wherein the aqueous emulsion further comprises an anionic surfactant.

9. The cleaning pad of claim 8 wherein the weight ratio of the surfactants is about 6–1:1 nonionic:anionic surfactant.

10. The cleaning pad of claim 1 wherein the particulate abrasive is coupled into said cell walls with an effective amount of a silane coupling agent.

11. The cleaning pad of claim 2 wherein the textile sheet is a nonwoven fabric comprising a polyester/rayon blend.

12. The cleaning pad of claim 11 which exhibits a breaking strength of about 3000–4000 g.

* * * * *

UNITED STATES PATENT AND TRADEMARK OFFICE
CERTIFICATE OF CORRECTION

PATENT NO. : 4,581,287
DATED       : April 8, 1986
INVENTOR(S) : James A. Smith

It is certified that error appears in the above-identified patent and that said Letters Patent is hereby corrected as shown below:

At column 1, line 36, for "form" read --foam--.

At column 1, line 44, for "forms" read --foams--.

At column 1, line 46, for "ordorant-containing" read --odorant-containing--.

At column 2, line 13, for "incorporate" read --incorporated--.

At column 9, line 67, for "$C_{12}14C_{15}$" read --$C_{12}$-$C_{15}$--.

At column 13, line 14, for "Neodol®25-35" read --Neodol®25-3S--.

Signed and Sealed this

Twenty-ninth Day of July 1986

[SEAL]

Attest:

DONALD J. QUIGG

Attesting Officer

Commissioner of Patents and Trademarks